(12) United States Patent
Thokchom et al.

(10) Patent No.: US 12,388,079 B2
(45) Date of Patent: Aug. 12, 2025

(54) HYBRID LITHIUM METAL CELL WITH IONIC LIQUID INTEGRATED CATHODE

(71) Applicant: Sakuu Corporation, San Jose, CA (US)

(72) Inventors: Joykumar Thokchom, Marietta, GA (US); Ali Modjtahedi, Santa Clara, CA (US); Yongtao Meng, Fremont, CA (US); Aditya Upreti, San Jose, CA (US); Muhammad Tariq, San Jose, CA (US)

(73) Assignee: Sakuu Corporation, San Jose, CA (US)

( * ) Notice: Subject to any disclaimer, the term of this patent is extended or adjusted under 35 U.S.C. 154(b) by 575 days.

(21) Appl. No.: 17/963,479

(22) Filed: Oct. 11, 2022

(65) Prior Publication Data

US 2024/0120470 A1    Apr. 11, 2024

(51) Int. Cl.
*H01M 10/052* (2010.01)
*H01M 4/04* (2006.01)
*H01M 4/38* (2006.01)
*H01M 4/02* (2006.01)

(52) U.S. Cl.
CPC ......... *H01M 4/382* (2013.01); *H01M 4/0404* (2013.01); *H01M 4/0414* (2013.01); *H01M 4/0435* (2013.01); *H01M 10/052* (2013.01); *H01M 2004/028* (2013.01)

(58) Field of Classification Search
CPC .............. H01M 4/382; H01M 4/0404; H01M 4/0414; H01M 4/0435; H01M 10/052; H01M 2004/028; H01M 10/0564; H01M 10/058; H01M 10/0565; H01M 10/0566; H01M 2004/021; H01M 2300/0045; H01M 2300/0082; H01M 2300/0091
See application file for complete search history.

(56) References Cited

U.S. PATENT DOCUMENTS

2021/0005927 A1*  1/2021  Hoffert ............. H01M 10/0585

FOREIGN PATENT DOCUMENTS

KR         20150132463 A  * 11/2015  ............ H01M 4/661

OTHER PUBLICATIONS

Machine translation of KR20150132463.*

* cited by examiner

*Primary Examiner* — Matthew T Martin
*Assistant Examiner* — Felicity B Alban
(74) *Attorney, Agent, or Firm* — Arman Khosraviani

(57) ABSTRACT

A method of manufacturing a calendered cathode structure for a hybrid lithium metal cell includes depositing a first cathode coating layer without ionic liquid onto a cathode current collector, depositing a second cathode coating layer with ionic liquid onto the first coating layer, and depositing a third cathode coating layer without ionic liquid onto the second coating layer. A calendaring process is then performed on the cathode structure comprising the cathode current collector with the first, second, and third coating layers thereon such that a predetermined thickness and porosity for the cathode structure is achieved while at the same time the ionic liquid is spread throughout the cathode electrode without reaching the cathode current collector.

20 Claims, 5 Drawing Sheets

HYBRID LITHIUM METAL CELL WITH IONIC LIQUID INTEGRATED CATHODE

TECHNICAL FIELD

The disclosure is directed generally to hybrid lithium metal cells for lithium batteries, and in particular to methods of manufacturing hybrid lithium metal cells.

BACKGROUND

Rechargeable lithium metal batteries have superior electrochemical capacity and high operating voltage, thus high energy density. Demand for lithium metal batteries is increasing in the fields of portable information terminals, portable electronic devices, small power storage devices for home use, motorcycles, electric cars, hybrid electric cars, and the like. Hence, improvements to the performance and the safety of lithium metal battery are desired in response to the increasing demand of such applications.

A lithium metal battery typically includes an anode and a cathode separated by an electrically insulating barrier or separator, and the electrolyte medium typically includes one or more lithium salts in one or more organic carbonate solvents with additional additives. During the charging process, the positively charged lithium ions move from the cathode, through the liquid electrolyte soaked/wetted permeable separator, to the anode and reduce into Li metal. During discharge, the Li metal is oxidized to positively charged lithium ions which move from the anode, through the liquid electrolyte soaked/wetted permeable separator, and back to the cathode, while electrons move through an external load from the anode to the cathode, yielding current and providing power for the load.

Conventional lithium batteries using graphite anode are reaching their theoretical capacity, leaving little room for performance improvement. In order to improve the energy density and performance of lithium batteries, lithium batteries having lithium metal anodes have been proposed. Lithium metal anodes have a very high theoretical capacity. However, the practical use of lithium metal anodes is challenging due to uncontrollable lithium dendrite growth and severe side reactions between lithium metal and conventional liquid electrolytes. Unlike liquid electrolytes, solid electrolytes have the potential to physically suppress the initiation and propagation of lithium dendrite growth. However, technical issues keep solid-state lithium metal batteries from making their way into demanding applications. One major issue is the design of the interface between cathode electrodes and solid electrolytes. It is difficult to achieve good contact between electrode materials and solid electrolytes because the solid electrolyte is typically rigid and brittle which makes it difficult for the electrode materials to conform to the surface of the electrolyte. In addition, any surface roughness on either side can lead to high interfacial resistance and triggering point for lithium dendrite formation due to non-uniform distribution of current density, which plagues battery performance and safety.

One method that has been used to construct a conformal interface between solid electrolyte and cathode electrodes is to introduce an ionic liquid into a cathode composition. A standard calendering process is then used to compress the cathode composition to form the cathode electrode. However, during the calendering process, the ionic liquid may be pressed into contact with the cathode current collector which can corrode the collector and/or adversely impact the adhesion of the collector to the cathode electrode. In either case, the contact surface between the collector and the cathode electrode may be compromised which can reduce the capacity as well as the life of the cell. Furthermore, cylindrical rolls of the calendering machine could be damaged (corroded) when they come in contact with oozing out ionic liquid during the calendering process. Also, there is a difficulty in infusing ionic liquid into conventionally made porous cathode due to high viscosity of ionic liquid unlike commonly used liquid electrolyte.

What is needed are methods of integrating ionic liquid into cathodes without adversely impacting the adhesion of the cathode current collector to the cathode electrode and without causing damage to the calendering rolls during the process.

SUMMARY

In one general aspect, the instant disclosure presents a method of manufacturing a calendered cathode structure for a hybrid lithium metal cell that includes forming a cathode structure by depositing a first precursor composition onto a cathode current collector to form a first cathode coating layer, the first precursor composition including a composite polymer electrolyte, a cathode active material, and one or more conductive additives without ionic liquid; depositing a second precursor composition onto the first cathode coating layer to form a second cathode coating layer, the second precursor composition including the composite polymer electrolyte, the cathode active material, one or more conductive additives and an ionic liquid; and depositing a third precursor composition onto the second cathode coating layer to form a third cathode coating layer, the third precursor composition including the composite polymer electrolyte, the cathode active material, and one or more conductive additives without ionic liquid. A calendering process is then performed on the cathode structure to form a cathode electrode on the cathode current collector from the first cathode coating layer, the second cathode coating layer, and the third cathode coating layer by feeding the cathode structure through a nip formed by a pair of calendering rolls to form a calendered cathode structure, the calendering process being carried out such that a cathode electrode of the calendered cathode structure has a predetermined thickness and porosity and the ionic liquid from the second cathode coating layer is distributed throughout the cathode electrode.

In yet another general aspect, the instant disclosure presents a method of manufacturing a hybrid lithium metal cell for a lithium battery that includes forming a cathode structure by depositing a first precursor composition onto a cathode current collector to form a first cathode coating layer, the first precursor composition including a composite polymer electrolyte and a cathode active material without ionic liquid; depositing a second precursor composition onto the first cathode coating layer to form a second cathode coating layer, the second precursor composition including the composite polymer electrolyte, the cathode active material and an ionic liquid; and depositing a third precursor composition onto the second cathode coating layer to form a third cathode coating layer, the third precursor composition including the composite polymer electrolyte and the cathode active material without ionic liquid. A calendering process is then performed on the cathode structure to form a cathode electrode on the cathode current collector from the first cathode coating layer, the second cathode coating layer, and the third cathode coating layer by feeding the cathode structure through a nip formed by a pair of calendering rolls to form a calendered cathode structure, the calendering process being carried out such that a cathode electrode of the calendered cathode structure has a predetermined thickness and porosity and the ionic liquid from the second cathode coating layer is distributed throughout the cathode electrode. An ionic liquid-incorporated composite polymer electrolyte is then deposited onto the cathode electrode. A lithium metal anode of an anode structure is then attached to the ionic liquid-incorporated composite polymer electrolyte, the anode structure including an anode current collector on a side of the anode structure opposite from the ionic liquid-incorporated composite polymer electrolyte.

In a further general aspect, the instant application describes a method of manufacturing a cathode structure for a hybrid lithium metal cell that includes forming a cathode structure by depositing a first precursor composition onto a cathode current collector to form a first cathode coating layer, the first precursor composition including a composite polymer electrolyte, a cathode active material and one or more conductive additives without ionic liquid; depositing a second precursor composition onto the first cathode coating layer to form a second cathode coating layer, the second precursor composition including the composite polymer electrolyte, the cathode active material, one or more conductive additives and an ionic liquid; and depositing a third precursor composition onto the second cathode coating layer to form a third cathode coating layer, the third precursor composition including the composite polymer electrolyte, the cathode active material and one or more conductive additives without ionic liquid. The cathode structure is then compressed to form a cathode electrode on the cathode current collector from the first cathode coating layer, the second cathode coating layer, and the third cathode coating layer. The compressing is carried out such that the ionic liquid is uniformly distributed throughout the cathode electrode.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DESCRIPTION

Figure 1:
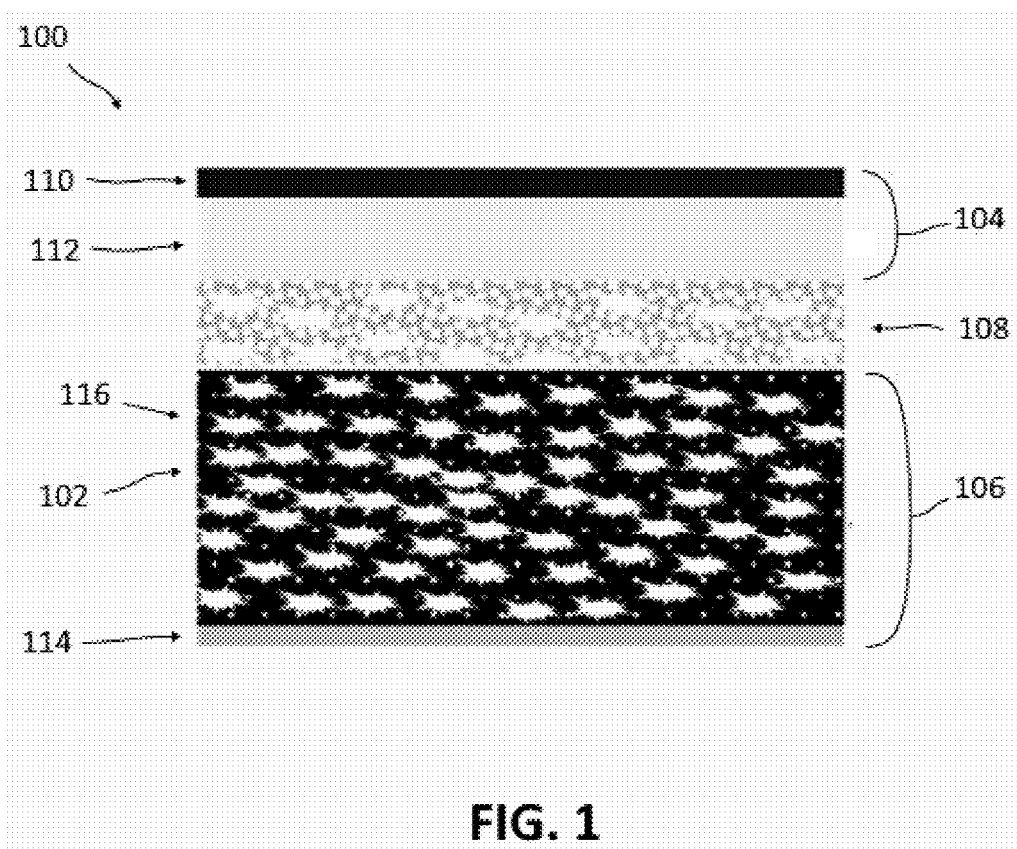
FIG. 1 shows an example of a lithium metal battery cell including an ionic liquid integrated cathode in accordance with this disclosure.

In the following detailed description, numerous specific details are set forth by way of examples to provide a thorough understanding of the disclosed subject matter. It may become apparent to persons of ordinary skill in the art, though, upon reading this disclosure, that one or more disclosed aspects may be practiced without such details. In addition, description of various example implementations according to this disclosure may include referencing of or to one or more known techniques or operations, and such referencing can be at relatively high-level, to avoid obscuring of various concepts, aspects and features thereof with details not particular to and not necessary for fully understanding the present disclosure.

As discussed above, previously known methods of integrating ionic liquid into cathode electrodes involved incorporating ionic liquid into the cathode slurry and then performing a calendering process to compress the cathode slurry to achieve a desired level of thickness and/or porosity for the cathode electrode. However, compressing the slurry can cause the ionic liquid to be squeezed into the interface between the collector and the cathode. Contact between the ionic liquid and the cathode current collector can result in poor adhesion of the cathode to the collector as well as corrosion of the collector. Furthermore, cylindrical rolls of the calendering machine could be damaged (corroded) when they come in contact with oozing out ionic liquid during the calendering process.

Another previously known method of integrating ionic liquid into porous cathode electrodes is to infuse with ionic liquid from surface of already calendered porous cathode structure without ionic liquid rather than incorporating it into the slurry during the process of making it. The calendering process is used to compress the cathode slurry to achieve a desired level of thickness and porosity for the cathode electrode then infuse the ionic liquid into the porous cathode material from the surface. However, this method can result in poor infusion and uniformity in the spread of the ionic liquid through the cathode due to the high viscosity of ionic liquid.

To address the problems posed by integrating ionic liquid into cathode electrodes for a lithium metal cell, the present disclosure provides a method of manufacturing a cathode structure for use with a hybrid lithium metal cell that enables to high conducting ionic liquid to be uniformly distributed throughout the cathode without affecting the cathode adhesion to the current collector and without facing the issue of calendering machine rolls be affected during the making process. In this method, three layers of cathode are coated on the same current collector one after another. In the first and last coatings, there is no ionic liquid in the formulation while the second (i.e., intermediate) coating does include ionic liquid. The ionic liquid present in the second coating is spread uniformly throughout the cathode structure during a compression process, such as a calendaring process. In this step, there is squeezing of the ionic liquid integrated into the middle coating to the porous top and bottom coatings. Various parameters of the process, such as the thickness and porosity of the three coatings, the amount of ionic liquid integrated into the second coating, and the pressure and/or speed of the calendering process, are controlled in such a way to achieve uniform distribution of the ionic liquid throughout the cathode structure without reaching the current collector. A composite polymer electrolyte integrated with the same ionic liquid is then coated onto the calendered and dried cathode to use as the separator for the cell. The final cell is then assembled by attaching (e.g. laminating) the lithium metal anode of the anode structure onto the composite polymer electrolyte.

The ionic liquid in the separator and in the cathode provides good surface contact between the separator and the cathode, thereby lowering the interfacial resistance of the layers of the cell. Having ionic liquid in both the composite polymer electrolyte and cathode layers enables forming continuous ionically conducting network throughout the cell. By utilizing three cathode coating layers in this manner to form the cathode, the ionic liquid does not reach the cathode current collector so the adhesion of the cathode to the current collector is not compromised. Furthermore, multiple cathode coating helps to prevent direct contact between corrosive ionic liquid and the stainless steel rolls during calendering which makes the process more efficient as the requirement for cleaning the rolls between uses is reduced.

FIG. 1 shows an example of a hybrid lithium metal cell 100 for a lithium battery that includes an ionic liquid-infused cathode 102 in accordance with this disclosure. As used herein, a "battery" refers to any container in which chemical energy is converted into electricity and used as a source of power. The terms "battery" and "cell" are generally interchangeable when referring to one electrochemical cell, although the term "battery" can also be used to refer to a plurality or stack of electrically interconnected cells. The hybrid lithium cell of FIG. 1 includes an anode structure 104, a cathode structure 106, and an electrolyte region 108.

The anode structure 104 of the hybrid lithium cell of FIG. 1 includes an anode current collector 110 (also referred to as a negative current collector) and a lithium metal anode 112 (i.e., anode electrode). In embodiments, the anode current collector 110 comprises a plate, sheet, foil, cloth, or the like formed of a suitable conductive material. Examples of conductive materials for use in the anode current collector include copper, copper foil, electrodeposited copper foil, copper alloy foil, nickel foil, electrodeposited nickel foil, stainless steel foil, carbon sheet/paper, and electronically conducting polymer sheet. In embodiments, the anode current collector 110 is provided with a thickness in a range from 5-30 microns. In one particular embodiment, the anode current collector 110 has a thickness of 8 microns.

The lithium metal anode 112 is formed of lithium metal material. In embodiments, the lithium metal material comprises lithium foil. The lithium foil may be bare lithium foil, organically cleaned lithium foil, smooth or perforated lithium foil, pure (100%) ceramic nanolayer (LiF, $Li_2O$, $Li_3N$, $Li_2CO_3$, $Li_3PO_4$, $Li_xPO_yN_z$ (LiPON)) coated lithium foil, nanoceramic composite polymer coated lithium, carbon nanotube (CNT), graphene with or without lithium salt, or binder coated lithium foil. In embodiments, the lithium foil is provided with a thickness in a range from 3-600 microns. In one particular embodiment, the lithium foil is provided with a thickness of 20 microns.

In embodiments, the anode current collector 110 is used as a substrate and mechanical support for the lithium metal anode 112, and the lithium metal anode is attached or otherwise adhered to the surface of the anode current collector 110. In embodiments, the lithium metal anode 112 is deposited onto the anode current collector using a suitable thin film deposition technique or method or screen printed using stabilized lithium powder.

The cathode structure 106 includes a cathode current collector 114 (also referred to herein as a positive current collector) and a composite cathode electrode (or simply composite cathode) 102. In embodiments, the cathode current collector 114 comprises a plate, sheet, foil, or the like formed of a suitable conductive material. Examples of materials that may be used to form the cathode current collector 114 include aluminum, stainless steel (with or without a thin carbon coating), metal coated with polymer sheet (e.g. polyimide), carbon fiber, carbon sheet/paper, carbon fiber, titanium, conductive polymer, and the like. In embodiments, the cathode current collector 114 has a thickness in a range from 5-30 microns. In one particular embodiment, the cathode current collector 114 has a thickness of 12 microns.

The composite cathode 102 has a material composition that includes a composite polymer electrolyte, a cathode active material, high surface area carbon or carbons, and an ionic liquid. The composite polymer electrolyte includes a base polymer material (which is used as a binder for the composition), lithium salts for ionic conductivity (i.e., the electrolyte), with an ionically conducting inorganic filler material. In embodiments, the polymer material comprises polyvinylidene difluoride (PVDF) and/or poly(vinylidene fluoride)-co-hexafluoropropylene (PVDF-HFP). In embodiments, the cathode active material has a particle size in range 3-20 microns. In embodiments, the cathode active material is included in the composition such the cathode active material has a loading range of 60%-94% by weight, a mass loading range of 5-25 $mg/cm^2$, and a capacity loading range of 1-6 $mAh/cm^2$.

The lithium salt included in the composite polymer electrolyte comprises any lithium stable salt, such as lithium bis(trifluoromethanesulfonyl)imide (LiTFSI), lithium bis (fluorosulfonyl) imide (LiFSI), lithium bis(fluorosulfonyl) amide (LiFSA), lithium bis(perfluoroethanesulfonyl)imide (LiBETI), lithium hexafluorophosphate ($LiPF_6$), lithium tetrafluoroborate ($LiFB_4$), lithium bis(oxalato)-borate (Li-BOB), lithium difluoro(oxalato)borate (LiDFOB), any lithium stable, or any combination of these. The ionically conducting inorganic fillers are chemically inert but have a high dielectric constant which enhances ion conductivity and high voltage stability. In embodiments, the active (ionically conducting) inorganic filler comprises ceramics, such as lithium garnets (e.g., LLZO, LLZO doped with Al, Ta, Nb and Ga, etc, multivalent doped LLZO garnet and the like), NASICON powder (such as LAGP, LATP, etc.), sulfide powder (e.g., argyrodite, LPS, LSnPS, LGPS, and the like), inactive fillers (such as $Al_2O_3$, $SiO_2$, and the like), and/or the like. When sulfide solid electrolyte is used in composite polymer electrolyte or cathode or both, ionic liquids are selected so that dissolution of the sulfide solid electrolyte in the ionic liquids is negligible. For example, solvate ionic liquids may be selected for use with sulfide solid electrolyte.

In embodiments, the cathode active material comprises a spinel and layered cathode active material. Examples of suitable cathode active materials include lithium iron phosphate (LFP), lithium manganese iron phosphate (LMFP), lithium cobalt oxide (LCO), lithium manganese oxide (LMO), lithium nickel cobalt aluminum oxide (NCA), lithium nickel cobalt manganese aluminum oxide (NCMA) lithium nickel manganese cobalt oxide (NMC), lithium nickel manganese oxide (LMNO), Li-rich cathodes, and combinations of these. When sulfide solid electrolyte is used in the cathode formulation, the cathode active materials are coated with a stable interface forming oxide layer such as $Li_2ZrO_3$, $LiTaO_3$, $LiNbO_3$, and the like. The interfacial layer formed by the oxide has a thickness in the range of 1 to 10 nanometer in order to prevent cathode active material from transition metal migration, intermixing, and formation of highly resistance interface with sulfide solid electrolyte particles. In some implementations, the composite cathode includes one or more conductive additives which are mixed into the composition to enhance conductivity. Examples of conductive additives that may be used include carbon black, acetylene black, Ketjen black, carbon nanofibers (CNFs), vapor-grown carbon fibers (VGCFs), carbon nanotube (CNT), graphene, conductive metals, alloy powders, and the like.

An ionic liquid 116 is uniformly integrated into the composite cathode 102. Any suitable ionic liquid may be used. In embodiments, the ionic liquid comprises one or more of EMIFSI, EMITFSI, EMIFSA, EMITFSA, EMIBF4, EMIMFSI, Pyr13FSI, Pyr13TFSI, Pyr13FSA, Pyr13TFSA, PyrBF4, Pyr14FSI, Pyr14TFSI, Pyr14FSA, Pyr14TFSA, PyrBF4, P13FSI, P13TFSI, P13FSA, P13TFSA, P13BF4, G3FSI, G3TFSI, G3FSA, G3TFSA, G3BF4, G4FSI, G4TFSI, G4TFSA, G4BF4, P1444FSI, P1444TFSI, P1444FSA, P1444TFSA PMPyrrFSI, PMPyrrTFSI, PMPy-rrFSA, PMPyrrTFSA, PMPyrrBF4, solvate ionic liquids such as Li(G)yX and Li(AN)yX (G: glyme, AN: acetonitrile, X: polyanion e.g., TFSI, FSI; y=number of glyme or acetonitrile chain e.g., 1-3) and their blends, and the like.

As discussed below, a compression process is utilized to compress the ionic liquid infused composite cathode 102 and cathode current collector 114 together to form a compressed cathode having a desired level of porosity and thickness for the composite cathode. In embodiments, the compression process is a calendaring process although any suitable type of compression process may be used. In embodiments, the composite cathode is provided with a thickness in a range from 20-120 microns and a porosity in a range from 10%-35%. The compression process is also used to disperse the ionic liquid substantially uniformly throughout the cathode electrode 102.

The electrolyte region 108 comprises a composite polymer electrolyte into which a high conducting, lithium metal stable ionic liquid has been uniformly integrated. In embodiments, the composite polymer electrolyte has a material composition that includes a base polymer material (which in this case is used as a binder for the composition), lithium salts for ionic conductivity (i.e., the electrolyte), and an ionically conducting inorganic filler material. Any lithium stable polymer or combination of lithium stable polymers may be used. In embodiments, the polymer material comprises polyvinylidene difluoride (PVDF) and/or poly(vinylidene fluoride)-co-hexafluoropropylene (PVDF-HFP).

The lithium salt included in the composite polymer electrolyte comprises any lithium stable salt, such as lithium bis(trifluoromethanesulfonyl)imide (LiTFSI), lithium bis (fluorosulfonyl) imide (LiFSI), lithium bis(fluorosulfonyl) amide (LiFSA), lithium bis(perfluoroethanesulfonyl)imide (LiBETI), lithium hexafluorophosphate ($LiPF_6$), lithium tetrafluoroborate ($LiFB_4$), lithium bis(oxalato)-borate (Li-BOB), lithium difluoro(oxalato)borate (LiDFOB), any lithium stable, or any combination of these. The inorganic fillers are chemically inert but have a high dielectric constant which enhances ion conductivity and high voltage stability. In embodiments, the inorganic filler comprises ceramics, such as lithium garnets (e.g., LLZO, LLZO doped with Al, Ta, Nb and Ga, etc, multivalent doped LLZO garnet and the like), NASICON powder (such as LAGP, LATP, etc.), sulfide powder (e.g., Argyrodite, LPS, LSnPS, LGPS, and the like), inactive fillers (such as $Al_2O_3$, $SiO_2$, and the like), and/or the like.

An ionic liquid is uniformly integrated into the composite cathode. Any suitable ionic liquid may be used. In embodiments, the ionic liquid comprises one or more of EMIFSI, EMITFSI, EMIFSA, EMITFSA, EMIBF4, Pyr13FSI, Pyr13TFSI, Pyr13FSA, Pyr13TFSA, PyrBF4, Pyr14FSI, Pyr14TFSI, Pyr14FSA, Pyr14TFSA, PyrBF4, P13FSI, P13TFSI, P13FSA, P13TFSA, P13BF4, G3FSI, G3TFSI, G3FSA, G3TFSA, G3BF4, G4FSI, G4TFSI, G4TFSA, G4BF4, P1444FSI, P1444TFSI, P1444FSA, P1444TFSA PMPyrrFSI, PMPyrrTFSI, PMPyrrFSA, PMPyrrTFSA, PMPyrrBF4, solvate ionic liquids such as Li(G)yX and Li(AN)yX (G: glyme, AN: acetonitrile, X: polyanion e.g., TFSI, FSI; y=number of glyme or acetonitrile chain) and their blends and the like.

In embodiments, the ionic liquid-incorporated composite polymer electrolyte for the electrolyte region 108 has the same formulation as the ionic liquid-infused composite polymer electrolyte used for the cathode electrode 102. In other embodiments, any suitable formulation of composite polymer electrolyte is used for the electrolyte region. The ionic liquid-incorporated composite polymer electrolyte has a predetermined thickness, porosity and density. In embodiments, the composite polymer electrolyte has a thickness in a range from 10-120 microns, a porosity in a range from 0%-35%, and a density in a range from 1.4-2.5 g/cc. In some embodiments, the composite polymer electrolyte serves as the separator for the lithium cell to prevent physical contact between the lithium metal anode and the cathode electrode while facilitating ion transport in the cell. In other embodiments, a separate structure, such as a porous polymer membrane, may be provided in addition to the composite polymer electrolyte to serve as a separator structure for the cell.

Once the anode structure 104 and cathode structure 106 have been formed, the lithium cell 100 is assembled with the electrolyte region to form the lithium cell as shown in FIG. 1. In embodiments, the lithium cell 100 is assembled by coating the composite polymer electrolyte for the separator 108 onto the cathode electrode 102 of the cathode structure and then attaching the lithium metal anode of the anode structure onto the composite polymer electrolyte separator. The ionic liquid in the cathode 102 and in the separator 108 effectively improves the contact between the cathode 102 and the separator 108 which in turn lowers the interfacial resistance between the cathode and the separator. Also, having ionic liquid in both the composite polymer electrolyte and cathode layers enables forming continuous ionically conducting network throughout the cell.

As noted above, previously known methods of infusing cathodes with ionic liquid involved using a standard calendering process to compress the cathode structure without ionic liquid to achieve the desired thickness and porosity for the cathode structure which is then infused with ionic liquid to the already compressed cathode. Infusing a cathode with ionic liquid in this manner, however, can result in poor infusion and uniformity in the spread of the ionic liquid through the cathode. For example, the ionic liquid may not be pressed far enough into the cathode result in little or partial penetration of ionic liquid into the cathode due to the high viscosity of ionic liquid. In this case, ionic conduction is not facilitated throughout the cathode.

Another previously known methods of integrating ionic liquid into cathode electrodes involved incorporating ionic liquid into the cathode slurry and then performing a calendering process to compress the cathode slurry to achieve a desired level of thickness and porosity for the cathode electrode. However, compressing the slurry can cause the ionic liquid to be squeezed into the interface between the collector and the cathode. Contact between the ionic liquid and the cathode current collector can result in poor adhesion of the cathode to the collector as well as corrosion of the collector. Furthermore, stainless steel cylindrical rolls of the calendering machine could be damaged (corroded) when they come in contact with oozing out ionic liquid during the calendering process.

To address the problems faced by infusing a cathode with ionic liquid, the present disclosure provides a method of manufacturing a hybrid lithium metal cell including an ionic liquid-infused cathode. In this method, three layers of cathode material are coated onto the same cathode current collector one on top of each other followed by a compression process, such as a calendaring process, which compresses the cathode coatings together to achieve a desired thickness and porosity for the cathode electrode while at the same time spreading the ionic liquid from the middle coating into the porous cathode material of the first and third layers.

Figure 2:
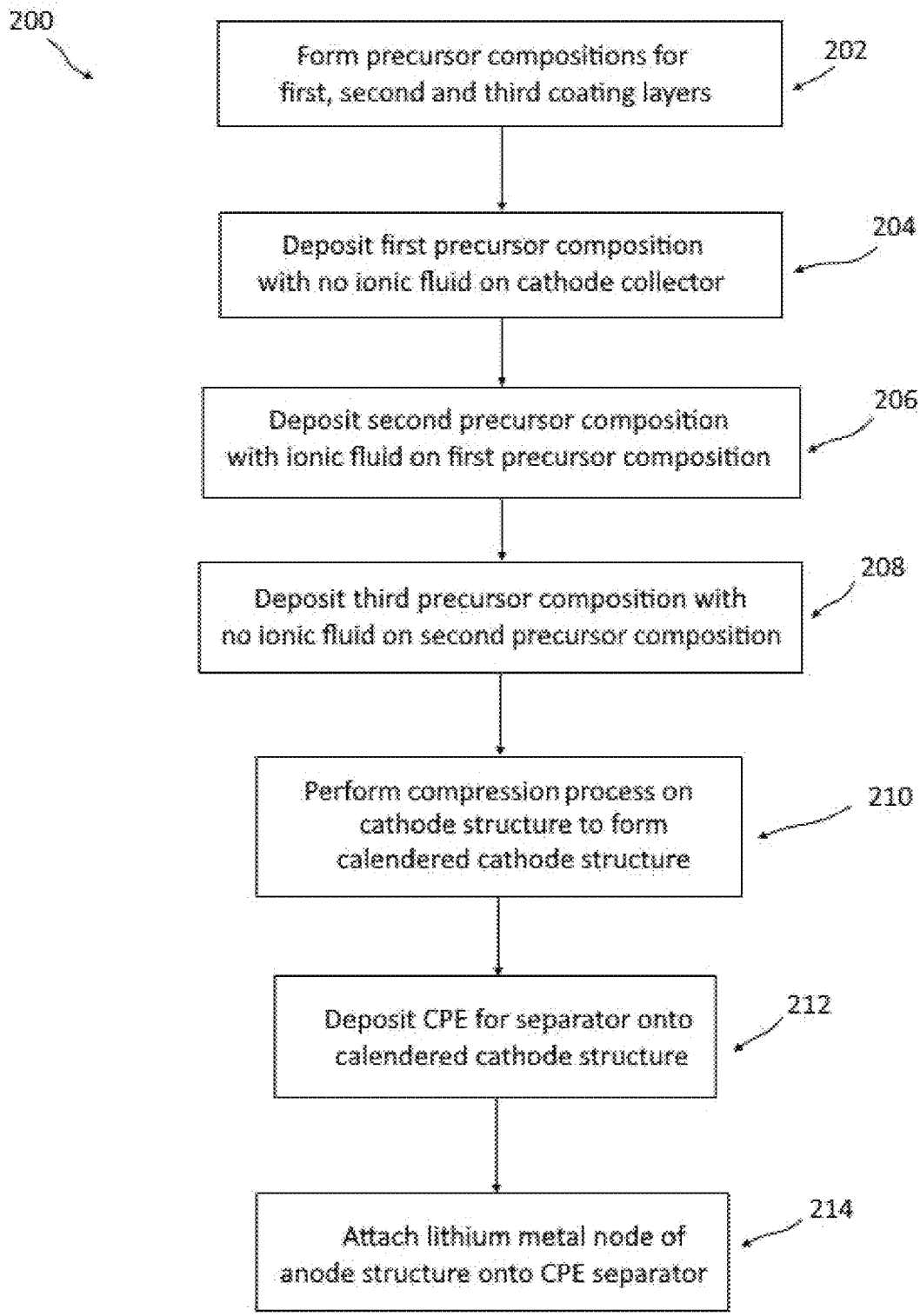
FIG. 2 shows a flowchart of an example method for manufacturing the lithium metal battery cell with the ionic liquid integrated cathode of FIG. 1.

An example method for manufacturing a hybrid lithium metal cell including an ionic liquid-infused cathode is depicted in FIG. 2. The method begins with combining materials used to form precursor cathode compositions (i.e., slurries) for the first, second and third cathode coating layers (block 202). In embodiments, the materials used to form the cathode layers are combined in predetermined ratios/amounts to form the precursor cathode compositions without ionic liquid for the first and third cathode coating layers and with ionic liquid for the second, or intermediate, coating layer. For example, the materials used to form the composite polymer electrolyte (e.g., base polymer material, lithium salt(s), and an ionically conducting inorganic filler) are combined with the cathode active material and other additives, such as conductive additives, dispersants, and the like, in a suitable solvent material and without ionic liquid to form a precursor cathode composition (i.e., a slurry) to be used for the first and third cathode coating layers. In embodiments, the same formulation may be used for the first, second, and third coating layers minus the ionic liquid although different formulations may be used for the first, second and/or third coating layers if needed and/or desired achieve a desired characteristic for the cathode.

Figure 3:
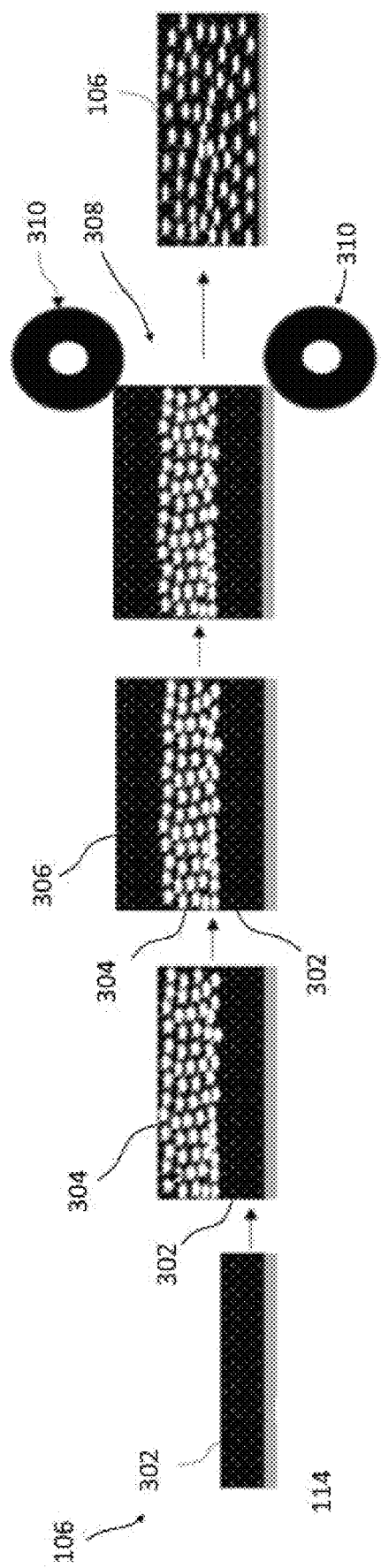
FIG. 3 shows the cathode structure after each stage of the coating and calendering process from the method of FIG. 2.
Figure 4:
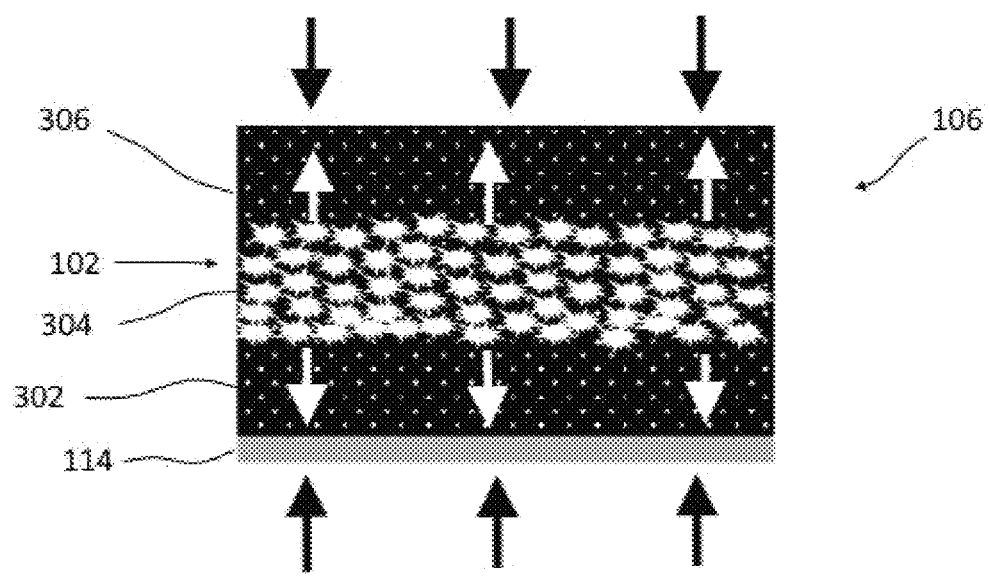
FIG. 4 shows the three-layered cathode structure of FIG. 3 with the pressure applied by the calendering rolls to spread the ionic liquid throughout the cathode structure.

The first precursor composition without ionic liquid is then deposited or coated onto the surface of the cathode current collector to form the first cathode coating layer (block 204). FIG. 3 shows the cathode structure 106 after each stage of the process. As seen in FIG. 3, the first precursor composition layer 302 without ionic fluid is deposited or coated. e.g., using a blade, onto the cathode collector 114 in the first step. The second precursor composition with ionic liquid is then deposited or coated. e.g., using a blade, onto the first precursor composition 302 to form the second cathode coating layer 304 (block 206). The third precursor composition without ionic liquid is then deposited or coated. e.g., using a blade, onto the second precursor composition 304 to form the third cathode coating layer 306 (block 208). Once the three precursor composition layers have been deposited onto the collector, a compression process is performed (block 210). In embodiments, the compression process comprises a calendaring process which is performed by feeding the cathode structure including the three layers and the collector through a nip 308 formed by a pair of calendering rolls 310, as depicted in FIG. 3. The calendering rolls 310 are configured to apply a predetermined amount of pressure as the cathode structure 106 is fed through the nip 308 at a predetermined rate of speed in order to achieve a desired thickness and porosity for the calendered cathode structure 106. The pressure of calendering process is also configured to squeeze the ionic liquid from the middle coating layer 304 into the cathode material of the first and third coating layers 302, 306, as depicted in FIG. 4.

The parameters of the cathode coating compositions and the compression (e.g., calendering) process are selected to achieve the desired thickness and porosity as well as spread of the ionic liquid throughout the cathode electrode. For example, the porosity of the compositions, the thicknesses of the coating layers, the amount of ionic liquid integrated into the middle coating layer, the pressure applied by the calendering rolls, and the feed rate of the cathode structure through the calendering nip are controlled to achieve the desired thickness, porosity, and ionic liquid distribution for the cathode electrode. The parameters are also selected so as to cause the spread of the ionic liquid without saturating the interface between the cathode current collector and the cathode electrode so as not to compromise the adhesion of the collector to the cathode.

In embodiments, the first, second, and third cathode coating layers are each provided with a thickness, prior to compression, in a range from 30-60 microns and a porosity, prior to compression, in a range from 20%-50%. In embodiments in which a calendaring process is used, the pressure applied by the calendering rolls and the feed rate of the cathode structure through the rolls is selected to result in a 5%-30% reduction in thickness of the cathode. In embodiments, the feed rate is in a range from 1-30 meters/minute. In embodiments, the calendering process is carried out in a manner such that the cathode has a final thickness in a range from 20-120 microns, and the calendering process is carried out such that the resulting cathode has a porosity in a range from 10%-35%. In some embodiments, a drying interval is provided between each coating step to allow at least partial drying of a newly deposited cathode layer before the next layer is deposited in order to improve the coatability of the deposited cathode layers. Any suitable drying interval may be utilized. Drying is performed at the temperature range of 60 to 140° C. with interval range of 10 minutes to 5 hours in order to achieve partial drying for the next coating layer. Drying method could be convection oven or heat lamp. Once three layers are formed and calendered with uniform distribution of ionic liquid in the structure, the cathode is further dried in vacuum at temperature range of 80 to 140° C. in vacuum oven for overnight before composite polymer electrolyte is coated on it to ensure complete removal of process solvent.

Once the compression and drying processes have been completed, the cathode structure 106 is then ready for coating with the composite polymer electrolyte (CPE) structure 108 containing the same ionic liquid. Then the two layered structure is further dried in vacuum oven at 80 to 140° C. for overnight. Then the CPE coated cathode having 106 and 108 layers of right shape and size is punched leaving current collector portion to be cleaned off later for further welding and to use as positive terminal for the battery during assembly. In another example coating of both the cathode and CPE are carried in the same process but by leaving out some portion of the current collector on the edge for using as positive terminal welding during the assembly. A hybrid lithium metal cell, such as depicted the cell 100 in FIG. 1 is assembled by attaching the CPE coated cathode with a lithium metal anode structure 104.

Figure 5:
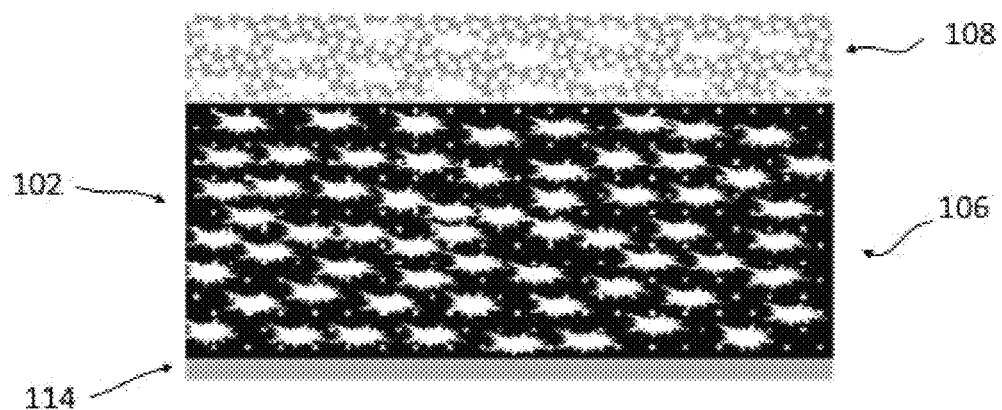
FIG. 5 shows the calendered cathode structure with the composite polymer separator deposited thereon.
Figure 6:
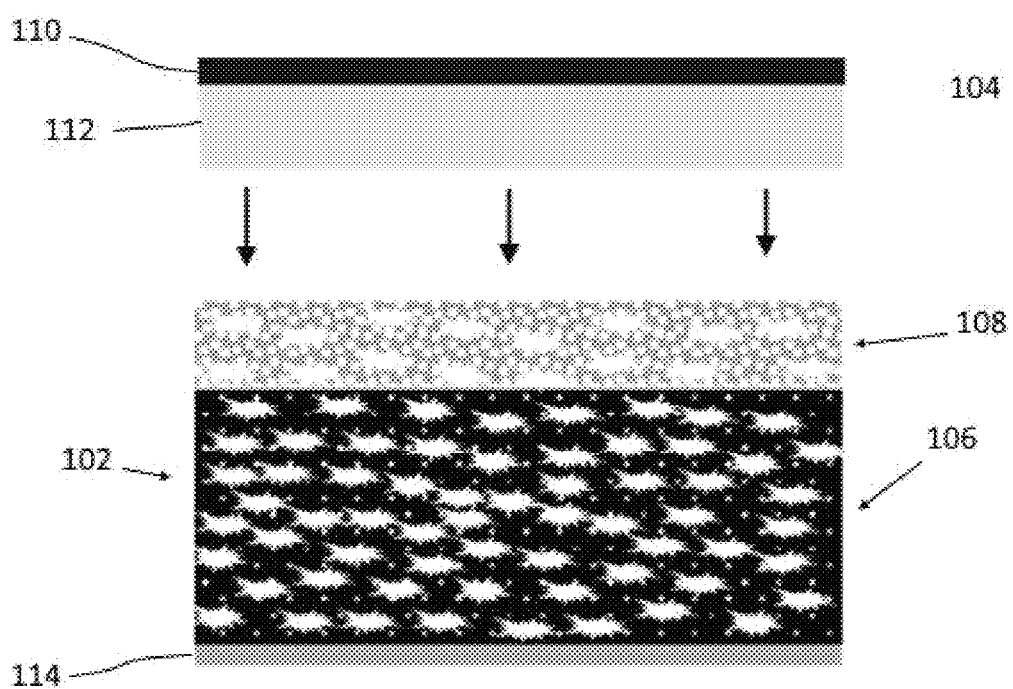
FIG. 6 shows the calendered cathode structure with the composite polymer electrode layer of FIG. 5 with the anode structure that is to be attached onto the composite polymer electrode layer.

In embodiments, to assemble the cell, the ionic liquid-incorporated composite polymer electrolyte separator is deposited onto a surface of the cathode 102 (block 212), e.g., on a side opposite from the collector 114, as depicted in FIG. 5. This entails combining the materials used to form the composite polymer electrolyte, such as the base polymer material with thermally or UV curable polymer, lithium salts, and an ionically conducting inorganic filler, with ionic liquid in a solvent to form a precursor CPE composition. In embodiments, the precursor composition comprises a slurry. In embodiments, additional materials, such as dispersants, photoinitiators and the like, are also included in the composition. The precursor CPE composition is then deposited onto the surface of the cathode. Once cured, the precursor CPE composition forms an ionic liquid-incorporated CPE separator for the hybrid lithium metal cell. A premade anode structure 104 is then assembled onto the CPE separator 106 as depicted in FIG. 6. In embodiments, the exposed side of the lithium metal anode 112 of the anode structure 104 (with the anode current collector 110) attached on the opposite side) is attached onto the CPE separator (block 214).

The ionic liquid in the separator 108 and in the cathode 102 provides good surface contact between the separator and the cathode, thereby lowering the interfacial resistance of the layers of the cell. Also, having ionic liquid in both the composite polymer electrolyte and cathode layers enables formation of a continuous ionically conducting network throughout the cell. By utilizing three cathode coating layers in this manner to form the cathode, the ionic liquid does not reach the cathode current collector so the adhesion of the cathode to the current collector is not compromised. Furthermore, multiple cathode coating helps to prevent direct contact between corrosive ionic liquid and the stainless-steel rolls during calendering which makes the process more efficient as the requirement for cleaning the rolls between uses is reduced.

In the following, further features, characteristics, and advantages of the instant application will be described via the following items:

Item 1. A method of manufacturing a calendered cathode structure for a hybrid lithium metal cell, the method comprises:
  forming a cathode structure by:
    depositing a first precursor composition onto a cathode current collector to form a first cathode coating layer, the first precursor composition including a composite polymer electrolyte, a cathode active material, and one or more conductive additives without ionic liquid;
    depositing a second precursor composition onto the first cathode coating layer to form a second cathode coating layer, the second precursor composition including the composite polymer electrolyte, the cathode active material, one or more conductive additives and an ionic liquid; and
    depositing a third precursor composition onto the second cathode coating layer to form a third cathode coating layer, the third precursor composition including the composite polymer electrolyte, the cathode active material, and one or more conductive additives without ionic liquid;
  performing a calendering process on the cathode structure to form a cathode electrode on the cathode current collector from the first cathode coating layer, the second cathode coating layer, and the third cathode coating layer by feeding the cathode structure through a nip formed by a pair of calendering rolls to form a calendered cathode structure, the calendering process being carried out such that:
    a cathode electrode of the calendered cathode structure has a predetermined thickness and porosity; and
    the ionic liquid from the second cathode coating layer is distributed throughout the cathode electrode.

Item 2. The method of item 1, wherein the first precursor composition and the third precursor composition are a same composition.

Item 3. The method of any of items 1 and 2, wherein the second precursor composition is similar as the first and the third except that the second precursor composition includes the ionic liquid.

Item 4. The method of any of items 1-3, wherein the first precursor composition, the second precursor composition, and the third precursor composition each comprise a slurry.

Item 5. The method of any of items 1-4, wherein the first cathode coating layer, the second cathode coating layer, and the third cathode coating layer each have a thickness before the calendering process in a range from 30-60 microns.

Item 6. The method of any of items 1-5, wherein the cathode electrode of the calendered cathode structure has a thickness in a range from 20-120 microns.

Item 7. The method of any of items 1-7, wherein the calendering process is carried out such that the ionic liquid is uniformly distributed throughout the cathode electrode without contacting the cathode current collector.

Item 8. A method of manufacturing a hybrid lithium metal cell for a lithium battery, the method comprising:
  forming a cathode structure by:
    depositing a first precursor composition onto a cathode current collector to form a first cathode coating layer, the first precursor composition including a composite polymer electrolyte and a cathode active material without ionic liquid;
    depositing a second precursor composition onto the first cathode coating layer to form a second cathode coating layer, the second precursor composition including the composite polymer electrolyte, the cathode active material and an ionic liquid; and
    depositing a third precursor composition onto the second cathode coating layer to form a third cathode coating layer, the third precursor composition including the composite polymer electrolyte and the cathode active material without ionic liquid;
  performing a calendering process on the cathode structure to form a cathode electrode on the cathode current collector from the first cathode coating layer, the second cathode coating layer, and the third cathode coating layer by feeding the cathode structure through a nip formed by a pair of calendering rolls to form a calendered cathode structure, the calendering process being carried out such that:
    a cathode electrode of the calendered cathode structure has a predetermined thickness and porosity; and
    the ionic liquid from the second cathode coating layer is distributed throughout the cathode electrode;

depositing an ionic liquid-incorporated composite polymer electrolyte onto the cathode electrode; and attaching a lithium metal anode of an anode structure to the ionic liquid-incorporated composite polymer electrolyte, the anode structure including an anode current collector on a side of the anode structure opposite from the ionic liquid incorporated composite polymer electrolyte.

Item 9. The method of item 8, wherein the first precursor composition and the third precursor composition have a same formulation.

Item 10. The method of any of items 8-9, wherein the first precursor composition, the second precursor composition, and the third precursor composition each comprise a slurry.

Item 11. The method of any of items 8-10, wherein the first cathode coating layer, the second cathode coating layer, and the third cathode coating layer each have a thickness before the calendering process in a range from 30-60 microns.

Item 12. The method of any of items 8-11, wherein the cathode electrode of the calendered cathode structure has a thickness in a range from 20-120 microns.

Item 13. The method of any of items 8-12, wherein the calendering process is carried out such that the ionic liquid is uniformly distributed throughout the cathode electrode without contacting the cathode current collector.

Item 14. The method of any of items 8-13, wherein the lithium metal anode comprises a lithium metal deposited on the current collector using a thin film deposition or screen printing using stabilized lithium powder.

Item 15. The method of any of items 8-14, wherein the lithium metal anode is attached onto the ionic liquid-incorporated composite polymer electrolyte.

Item 16. The method of any of items 8-15, wherein the ionic liquid-i incorporated composite polymer electrolyte serves as a separator for the hybrid lithium metal cell.

Item 17. A method of manufacturing a cathode structure for a hybrid lithium metal cell, the method comprises:

forming a cathode structure by:

depositing a first precursor composition onto a cathode current collector to form a first cathode coating layer, the first precursor composition including a composite polymer electrolyte, a cathode active material and one or more conductive additives without ionic liquid;

depositing a second precursor composition onto the first cathode coating layer to form a second cathode coating layer, the second precursor composition including the composite polymer electrolyte, the cathode active material, one or more conductive additives and an ionic liquid; and depositing a third precursor composition onto the second cathode coating layer to form a third cathode coating layer, the third precursor composition including the composite polymer electrolyte, the cathode active material and one or more conductive additives without ionic liquid;

compressing the cathode structure to form a cathode electrode on the cathode current collector from the first cathode coating layer, the second cathode coating layer, and the third cathode coating layer, wherein the compressing is carried out such that the ionic liquid is uniformly distributed throughout the cathode electrode.

Item 18. The method of item 17, wherein the first cathode coating layer, the second cathode coating layer, and the third cathode coating layer each have a thickness before the compressing in a range from 30-60 microns.

Item 19. The method of any of items 17-18, wherein the cathode electrode has a thickness in a range from 20-120 microns.

Item 20. The method of any of items 17-19, wherein the compressing is carried out such that the ionic liquid is uniformly distributed throughout the cathode electrode without contacting the cathode current collector.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. For example, although described as a method for curing and bonding non-cured layers to a stack of cured layers, the methodology can be applied to any layer of material which is created in one phase (e.g., fluid), to which energy is subsequently applied to convert the layer or material to another phase (e.g., solid), while simultaneously being bonded to previously bonded layers. For example, thermoplastic layers to which heat can be applied to convert them into bonding layers; or monomers, which can be polymerized to form polymers using heat or UV radiation.

Unless otherwise stated, all measurements, values, ratings, positions, magnitudes, sizes, and other specifications that are set forth in this specification are approximate, not exact. They are intended to have a reasonable range that is consistent with the functions to which they relate and with what is customary in the art to which they pertain.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

What is claimed is:

1. A method of manufacturing a calendered cathode structure for a hybrid lithium metal cell, the method comprises:
   forming a cathode structure by:
      depositing a first precursor composition onto a cathode current collector to form a first cathode coating layer, the first precursor composition including a composite polymer electrolyte, a cathode active material, and one or more conductive additives without ionic liquid;
      depositing a second precursor composition onto the first cathode coating layer to form a second cathode coating layer, the second precursor composition including the composite polymer electrolyte, the cathode active material, one or more conductive additives and an ionic liquid; and
      depositing a third precursor composition onto the second cathode coating layer to form a third cathode coating layer, the third precursor composition including the composite polymer electrolyte, the cathode active material, and one or more conductive additives without ionic liquid;
   performing a calendering process on the cathode structure to form a cathode electrode on the cathode current collector from the first cathode coating layer, the second cathode coating layer, and the third cathode coating layer by feeding the cathode structure through a nip formed by a pair of calendering rolls to form a calendered cathode structure, the calendering process being carried out such that:
      a cathode electrode of the calendered cathode structure has a predetermined thickness and porosity; and
      the ionic liquid from the second cathode coating layer is distributed throughout the cathode electrode.

2. The method of claim 1, wherein the first precursor composition and the third precursor composition are a same composition.

3. The method of claim 1, wherein the second precursor composition is similar as the first and the third except that the second precursor composition includes the ionic liquid.

4. The method of claim 1, wherein the first precursor composition, the second precursor composition, and the third precursor composition each comprise a slurry.

5. The method of claim 1, wherein the first cathode coating layer, the second cathode coating layer, and the third cathode coating layer each have a thickness before the calendering process in a range from 30-60 microns.

6. The method of claim 5, wherein the cathode electrode of the calendered cathode structure has a thickness in a range from 20-120 microns.

7. The method of claim 1, wherein the calendering process is carried out such that the ionic liquid is uniformly distributed throughout the cathode electrode without contacting the cathode current collector.

8. A method of manufacturing a hybrid lithium metal cell for a lithium battery, the method comprising:
   forming a cathode structure by:
      depositing a first precursor composition onto a cathode current collector to form a first cathode coating layer, the first precursor composition including a composite polymer electrolyte and a cathode active material without ionic liquid;
      depositing a second precursor composition onto the first cathode coating layer to form a second cathode coating layer, the second precursor composition including the composite polymer electrolyte, the cathode active material and an ionic liquid; and
      depositing a third precursor composition onto the second cathode coating layer to form a third cathode coating layer, the third precursor composition including the composite polymer electrolyte and the cathode active material without ionic liquid;
   performing a calendering process on the cathode structure to form a cathode electrode on the cathode current collector from the first cathode coating layer, the second cathode coating layer, and the third cathode coating layer by feeding the cathode structure through a nip formed by a pair of calendering rolls to form a calendered cathode structure, the calendering process being carried out such that:
      a cathode electrode of the calendered cathode structure has a predetermined thickness and porosity; and
      the ionic liquid from the second cathode coating layer is distributed throughout the cathode electrode;
   depositing an ionic liquid-incorporated composite polymer electrolyte onto the cathode electrode; and
   attaching a lithium metal anode of an anode structure to the ionic liquid-incorporated composite polymer electrolyte, the anode structure including an anode current collector on a side of the anode structure opposite from the ionic liquid-incorporated composite polymer electrolyte.

9. The method of claim 8, wherein the first precursor composition and the third precursor composition have a same formulation.

10. The method of claim 8, wherein the first precursor composition, the second precursor composition, and the third precursor composition each comprise a slurry.

11. The method of claim 8, wherein the first cathode coating layer, the second cathode coating layer, and the third cathode coating layer each have a thickness before the calendering process in a range from 30-60 microns.

12. The method of claim 11, wherein the cathode electrode of the calendered cathode structure has a thickness in a range from 20-120 microns.

13. The method of claim 8, wherein the calendering process is carried out such that the ionic liquid is uniformly distributed throughout the cathode electrode without contacting the cathode current collector.

14. The method of claim 8, wherein the lithium metal anode comprises a lithium metal deposited on the current collector using a thin film deposition or screen printing using stabilized lithium powder.

15. The method of claim 8, wherein the lithium metal anode is attached onto the ionic liquid-incorporated composite polymer electrolyte.

16. The method of claim 8, wherein the ionic liquid-incorporated composite polymer electrolyte serves as a separator for the hybrid lithium metal cell.

17. A method of manufacturing a cathode structure for a hybrid lithium metal cell, the method comprises:
   forming a cathode structure by:
      depositing a first precursor composition onto a cathode current collector to form a first cathode coating layer, the first precursor composition including a composite polymer electrolyte, a cathode active material and one or more conductive additives without ionic liquid;
      depositing a second precursor composition onto the first cathode coating layer to form a second cathode coating layer, the second precursor composition including the composite polymer electrolyte, the cathode active material, one or more conductive additives and an ionic liquid; and depositing a third precursor composition onto the second cathode coating layer to form a third cathode coating layer, the third precursor composition including the composite polymer electrolyte, the cathode active material and one or more conductive additives without ionic liquid;

compressing the cathode structure to form a cathode electrode on the cathode current collector from the first cathode coating layer, the second cathode coating layer, and the third cathode coating layer, wherein the compressing is carried out such that the ionic liquid is uniformly distributed throughout the cathode electrode.

18. The method of claim 17, wherein the first cathode coating layer, the second cathode coating layer, and the third cathode coating layer each have a thickness before the compressing in a range from 30-60 microns.

19. The method of claim 17, wherein the cathode electrode has a thickness in a range from 20-120 microns.

20. The method of claim 17, wherein the compressing is carried out such that the ionic liquid is uniformly distributed throughout the cathode electrode without contacting the cathode current collector.

* * * * *